(12) United States Patent
Peterson et al.

(10) Patent No.: US 10,779,221 B1
(45) Date of Patent: Sep. 15, 2020

(54) WIRELESS NETWORK SESSION MANAGEMENT

(71) Applicant: GOODRICH CORPORATION, Charlotte, NC (US)

(72) Inventors: Kevin C. Peterson, Bloomington, IL (US); Shailashri Shivappa Kuruvatti, Cary, NC (US); Jeremy Henderson, Chandler, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/505,237

(22) Filed: Jul. 8, 2019

(51) Int. Cl.
*H04W 48/02* (2009.01)
*H04W 76/36* (2018.01)
*B65G 1/137* (2006.01)
*H04W 76/38* (2018.01)
*H04W 88/08* (2009.01)

(52) U.S. Cl.
CPC ......... *H04W 48/02* (2013.01); *B65G 1/1375* (2013.01); *H04W 76/36* (2018.02); *H04W 76/38* (2018.02); *H04W 88/08* (2013.01)

(58) Field of Classification Search
CPC .................................................... H04W 48/02
See application file for complete search history.

(56) References Cited

U.S. PATENT DOCUMENTS 10,085,135 B2 * 9/2018 Robertson .......... G07C 9/00571
2018/0227891 A1 * 8/2018 Yang .................... H04W 72/005

\* cited by examiner

*Primary Examiner* — Ankur Jain
(74) *Attorney, Agent, or Firm* — Snell & Wilmer L.L.P.

(57) ABSTRACT

A method for limiting control of a cargo handling system may comprise receiving, by a controller of a wireless access point, a system control request from a PED. The controller may determine a number of devices currently controlling the cargo handling system. The controller may send a first control key to the PED if the number of devices controlling the cargo handling system is fewer than a threshold number of devices or the controller may send a request denied message if the number of devices controlling the cargo handling system is greater than or equal to the threshold number of devices.

20 Claims, 6 Drawing Sheets

WIRELESS NETWORK SESSION MANAGEMENT

FIELD

The present disclosure relates to cargo handling systems, and more specifically, to wireless network session management for cargo handling systems.

BACKGROUND

Cargo handling systems move loads, for example, pallets or unit load devices (ULDs), through the cargo area of an aircraft using motorized wheels (e.g., power drive units (PDUs) and freighter common turntables (FCTs)) located generally along on a cargo deck of the aircraft. The movement of ULDs is generally controlled by an operator using a control device. For example, a portable electronic device (PED), such as a tablet or cellular phone, may be enabled to control various components (e.g., PDUs and FCTs) of the cargo handling system. The PED may interface with and control the cargo handling system via a wireless access point (WAP). Multiple operators with multiple PED may be within the cargo deck. Allowing more than one operator to control the cargo handling system components, and thus the movement of cargo through the cargo deck, presents safety concerns.

SUMMARY

An article of manufacture including a tangible, non-transitory computer-readable storage medium having instructions stored thereon for limiting control of a cargo handling system to a preselected number of devices is disclosed herein. The instructions, in response to execution by a controller of a wireless access point, cause the controller to perform operations. In accordance with various embodiments, the operations may comprise receiving, by the controller, a system control request from a portable electronic device; determining, by the controller, a number of devices currently controlling the cargo handling system; and sending, by the controller, at least one of a first control key or a control request denied message to the portable electronic device. The controller may be configured to send the first control key to the portable electronic device if the number of devices currently controlling the cargo handling system is fewer than a threshold number of allowed devices. The controller may be configured to send the control request denied message to the portable electronic device if the number of devices currently controlling the cargo handling system is greater than or equal to the threshold number of allowed devices.

In various embodiments, the operations may further comprise receiving, by the controller, a control command including an identification key from the portable electronic device; comparing, by the controller, the identification key to the first control key; and sending, by the controller, at least one of the control command or a bad key message in response to the comparison of the identification key to the first control key. The controller may be configured to send the first control key to a component of the cargo handling system if the identification key matches the first control key. The controller may be configured to send the bad key message to the portable electronic device if the identification key is different from the first control key.

In various embodiments, the operations may further comprise adding, by the controller, one device to the number of devices currently controlling the cargo handling system in response to sending the first control key to the portable electronic device.

In various embodiments, the operations may further comprise starting, by the controller, a timer in response to sending the first control key to the portable electronic device; and resetting, by the controller, the timer to zero each time a control command including an identification key matching the first control key is received from the portable electronic device.

In various embodiments, the operations may further comprise generating, by the controller, a second control key if the timer exceeds an inactivity threshold time; and subtracting, by the controller, one device from the number of devices currently controlling the cargo handling system in response to the timer exceeding the inactivity threshold time. Generation of the second control key may void the first control key.

In various embodiments, the operations may further comprise receiving, by the controller, a relinquish control signal from the portable electronic device; and subtracting, by the controller, one device from the number of devices currently controlling the cargo handling system in response to receiving the relinquish control signal.

In various embodiments, the operations may further comprise generating, by the controller, a second control key in response to receiving the relinquish control signal. Generation of the second control key may void the first control key.

In various embodiments, the threshold number of allowed devices is one.

A method for limiting control of a cargo handling system to a preselected number of devices is also disclosed herein. In accordance with various embodiments, the method may comprise receiving, by a controller of a wireless access point, a system control request from a portable electronic device; determining, by the controller, a number of devices currently controlling the cargo handling system; and sending, by the controller, at least one of a first control key or a control request denied message to the portable electronic device. The controller may be configured to send the first control key to the portable electronic device if the number of devices currently controlling the cargo handling system is fewer than a threshold number of allowed devices. The controller may be configured to send the control request denied message to the portable electronic device if the number of devices currently controlling the cargo handling system is greater than or equal to the threshold number of allowed devices.

In various embodiments, the method may further comprise receiving, by the controller, a control command including an identification key from the portable electronic device; comparing, by the controller, the identification key to the first control key; and sending, by the controller, at least one of the control command or a bad key message in response to the comparison of the identification key to the first control key. The controller may be configured to send the control command to a component of the cargo handling system if the identification key matches the first control key. The controller may be configured to send the bad key message to the portable electronic device if the identification key is different from the first control key.

In various embodiments, the method may further comprise adding, by the controller, one device to the number of devices currently controlling the cargo handling system in response to sending the first control key to the portable electronic device.

In various embodiments, the method may further comprise starting, by the controller, a timer in response to sending the first control key to the portable electronic device; and resetting, by the controller, the timer to zero each time a control command including an identification key matching the first control key is received from the portable electronic device.

In various embodiments, the method may further comprise generating, by the controller, a second control key if the timer exceeds an inactivity threshold time, wherein generation of the second control key voids the first control key; and subtracting, by the controller, one device from the number of devices currently controlling the cargo handling system in response to the timer exceeding the inactivity threshold time.

In various embodiments, the method may further comprise receiving, by the controller, a relinquish control signal from the portable electronic device; and subtracting, by the controller, one device from the number of devices currently controlling the cargo handling system in response to receiving the relinquish control signal.

In various embodiments, the method may further comprise generating, by the controller, a second control key in response to receiving the relinquish control signal, wherein generation of the second control key voids the first control key.

A wireless access point system for limiting control of a cargo handling system to a preselected number of devices is also disclosed herein. In accordance with various embodiments, the wireless access point system may comprise a controller and a tangible, non-transitory storage medium configured to communicate with the controller. The controller may be in operable communication with a power drive unit of the cargo handling system. The tangible, non-transitory storage medium may have instructions stored thereon that, in response to execution by the controller, cause the controller to perform operations which may comprise receiving, by the controller, a system control request from a portable electronic device; determining, by the controller, a number of devices currently controlling the cargo handling system; and sending, by the controller, at least one of a first control key or a control request denied message to the portable electronic device. The controller may be configured to send the first control key to the portable electronic device if the number of devices currently controlling the cargo handling system is fewer than a threshold number of allowed devices. The controller may be configured to send the control request denied message to the portable electronic device if the number of devices currently controlling the cargo handling system is greater than or equal to the threshold number of allowed devices.

In various embodiments, the operations may further comprise receiving, by the controller, a control command including an identification key from the portable electronic device; comparing, by the controller, the identification key to the first control key; and sending, by the controller, at least one of the control command to a component of the cargo handling system if the identification key matches the first control key or a bad key message to the portable electronic device if the identification key is different from the first control key.

In various embodiments, the operations may further comprise starting, by the controller, a timer in response to sending the first control key to the portable electronic device; and resetting, by the controller, the timer to zero each time a signal including an identification key matching the first control key is received from the portable electronic device.

In various embodiments, the operations may further comprise subtracting, by the controller, one device from the number of devices currently controlling the cargo handling system in response to at least one of receiving, by the controller, a relinquish control signal from the portable electronic device; or determining, by the controller, that the timer has exceeded an inactivity threshold time.

In various embodiments, the operations may further comprise generating, by the controller, a second control key. Generation of the second control key may void the first control key.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like numbers denote to like elements.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with a tail (e.g., the back end) of an aircraft. As used herein, "forward" refers to the direction associated with a nose (e.g., the front end) of the aircraft, or generally, to the direction of flight or motion. As used herein, "longitudinal" refers to a forward to aft direction.

A system for limiting access to a wireless access point to a preselected number of devices at a time is disclosed herein. In various embodiments, the wireless access point serves as an interface between a control device (e.g., a PED) and the components of the cargo handling system. The system is configured to accept commands from a preselected number of control devices.

Figure 1A:
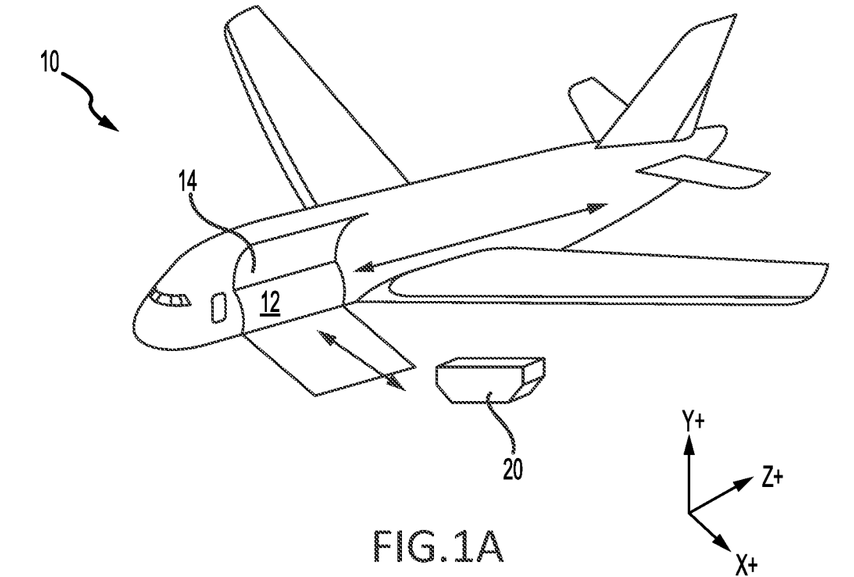
FIG. 1A illustrates an aircraft being loaded with cargo, in accordance with various embodiments.

With reference to FIG. 1A, an aircraft 10 having a cargo deck 12 is illustrated. Aircraft 10 may comprise a cargo load door 14. Cargo 20 may be loaded through cargo load door 14 and onto cargo deck 12. Items to be shipped by air, freight, and/or the like are typically loaded first onto specially configured pallets or into specially configured containers. In aviation, those various pallets and/or containers are commonly are referred to as unit load devices (ULDs). In various embodiments, cargo 20 may be a ULD. Once inside aircraft 10, the cargo 20 is moved along cargo deck 12 to its final stowage position. Multiple pieces of cargo may be brought on-board aircraft 10, during one or more loading procedures (e.g., at separate destinations), with each piece of cargo being placed in its respective stowage and transportation position on cargo deck 12. After aircraft 10 has reached its destination, cargo 20 may be unloaded from aircraft 10 similarly, but in reverse sequence to the loading procedure.

Figure 1B:
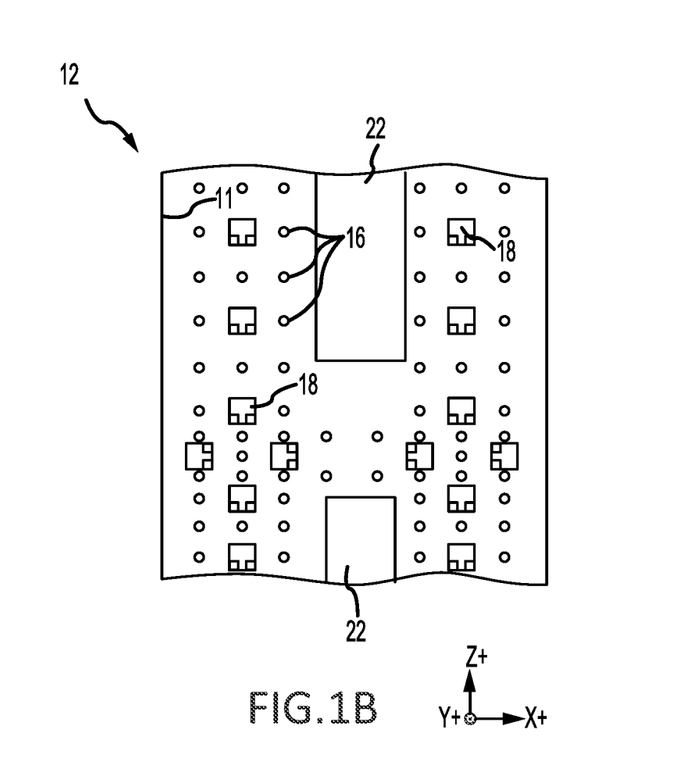
FIG. 1B illustrates a portion of an aircraft cargo deck, in accordance with various embodiments.

With reference to FIG. 1B, cargo deck 12 is illustrated in greater detail. The cargo deck 12 may be defined by inner walls 11 of aircraft 10. Cargo deck 12 may include a plurality of freely rotating conveyance rollers 18, a number of power drive units (PDUs) 18 mounted in cargo deck 12. PDUs 18 may be configured to propel cargo over conveyance rollers 16 and across cargo deck 12. In various embodiments, cargo deck 12 may include one or more FCTs 22.

Figure 2:
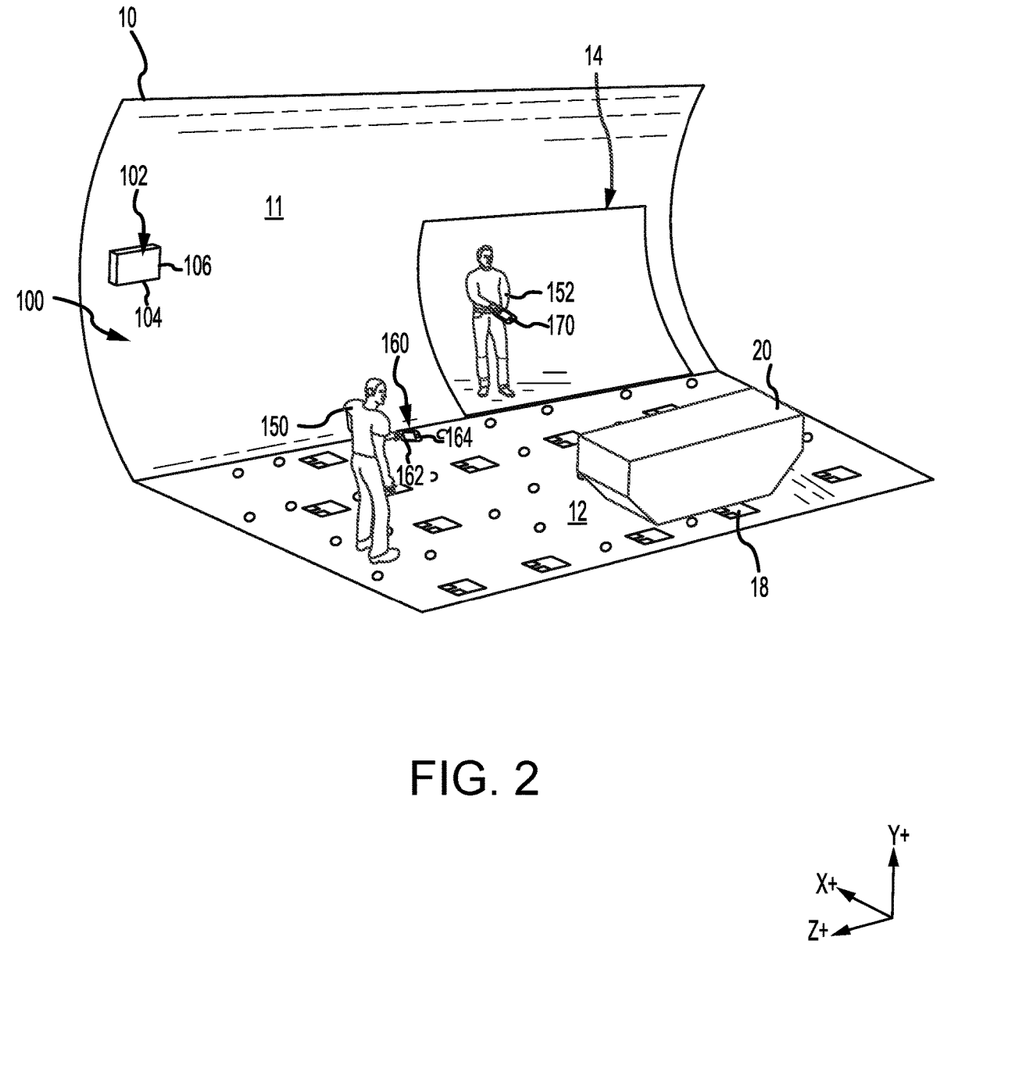
FIG. 2 illustrates a perspective view of an operator controlling translation cargo, in accordance with various embodiments.

Referring to FIG. 2, to facilitate movement of cargo 20 along cargo deck 12, aircraft 10 may include a cargo handling system 100. Cargo handling system 100 may be configured to control and monitor the cargo loading and unloading processes. Cargo handling system 100 may be configured such that components of cargo handling system 100 (e.g., PDUs 18) may be controlled by a PED. In various embodiments, cargo handling system 100 may comprise a wireless access point (WAP) 102. WAP 102 may be in operable communication, via wired or wireless connection, with PDUs 18 and/or other components of cargo handling system 100 that convey cargo 20. WAP 102 may be configured to allow PEDs to interface with and control cargo handling system 100. For example, an operator 150 may use PED 160 to send command signals to PDUs 18 to control the movement of cargo 20 over cargo deck 12. PED 160 is configured to wirelessly communicate with WAP 102. In this regard, PED 160 may be wirelessly connected to WAP 102 such that signals (e.g. control requests, command signals, control keys, etc.) may be sent wirelessly between PED 160 and WAP 102. PED 160 being wirelessly connected to WAP 102 allows PED 160 to control PDUs 18. Stated differently, if PED 160 is not connected to WAP 102, signals sent from PED 160 may not be conveyed to PDUs 18.

WAP 102 may be computer based, and may comprise a controller 104, a tangible, non-transitory computer-readable storage medium 106, and/or a network interface, along with other suitable system software and hardware components. Controller 104 may include and communicate with one or more processors and one or more tangible, non-transitory storage medium(s) 106 and is capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof.

System program instructions and/or processor instructions may be loaded onto tangible, non-transitory computer-readable storage medium 106. The system program instructions and/or processor instructions may, in response to execution by controller 104, cause controller 104 to perform various operations. In particular, and as described in further detail below, the instructions may allow controller 104 to determine a number of devices (e.g., PEDs) currently connected to WAP 102 and/or controlling cargo handling system 100. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

PED 160 may be a tablet, a cellular phone, a laptop computer, or any other apparatus capable of interfacing with PDUs 18 via a wireless connection to WAP 102. PED 160 may be computer based, and may comprise a PED controller 162, a tangible, non-transitory computer-readable storage medium 164, and/or a network interface, along with other suitable system software and hardware components. PED controller 162 may include and communicate with one or more processors and one or more tangible, non-transitory storage medium(s) 164 and is capable of implementing logic. The processor can be a general purpose processor, a DSP, an ASIC, a FPGA or other programmable logic device, discrete gate or transistor logic, discrete hardware components, or a combination thereof.

System program instructions and/or processor instructions may be loaded onto tangible, non-transitory computer-readable storage medium 164. The system program instructions and/or processor instructions may, in response to execution by PED controller 162, cause PED controller 162 to perform various operations. In particular, and as described in further detail below, the instructions may cause PED controller 162 to send and receive various signals to and from WAP 102.

WAP 102 may be configured to receive a control request from a PED, determine a number of PEDs currently controlling cargo handling system, and in response to the number of PED determination decide if a control key should be sent to the PED.

Figure 3:
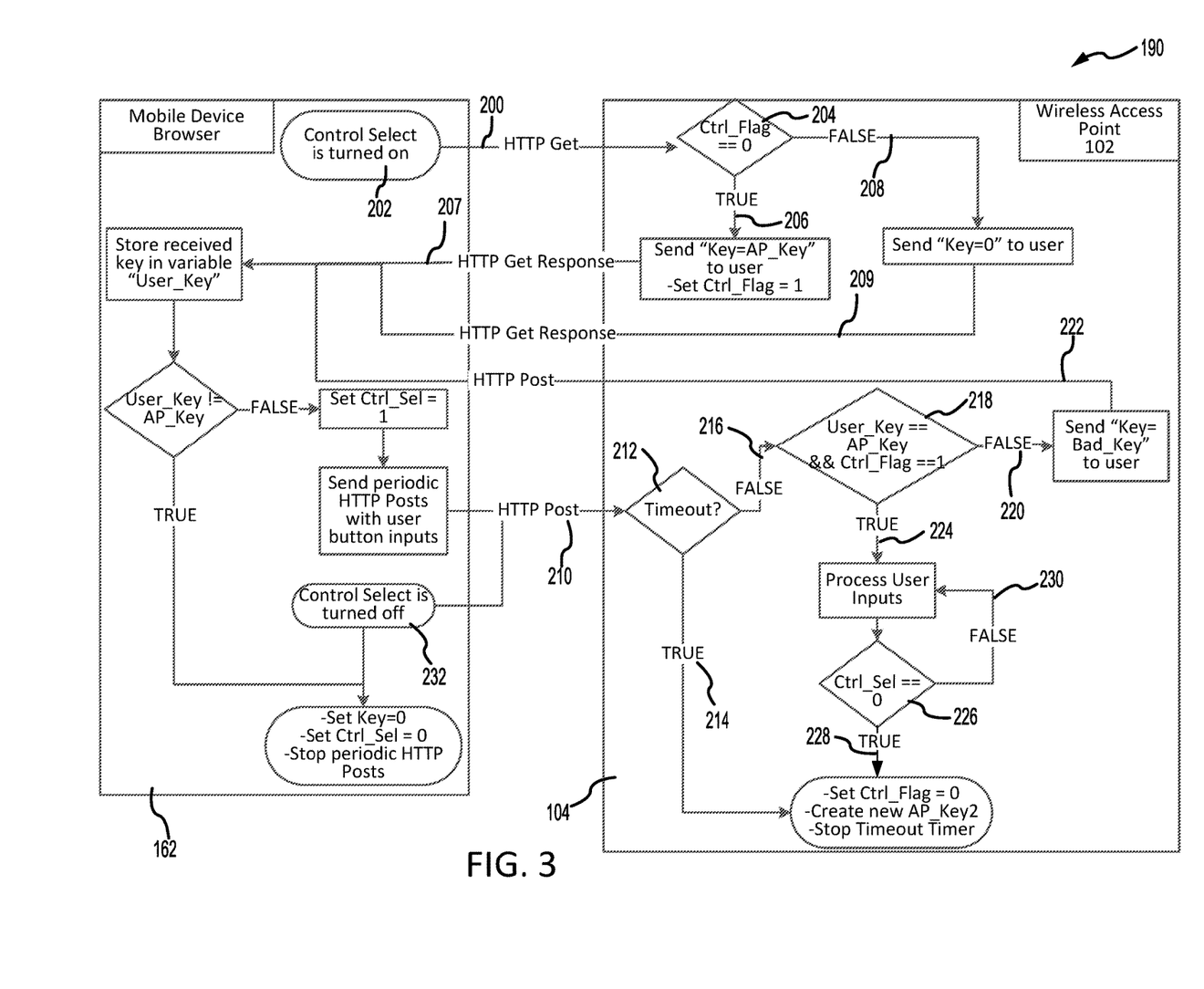
FIG. 3 illustrates a schematic block diagram of a system for limiting control of a cargo handling system to a preselected number of devices, in accordance with various embodiments.

For example, and with reference to FIG. 3, a system 190 for limiting control of cargo handling system to a preselected number of devices is illustrated. In various embodiments, system 190 includes controller 104 of WAP 102. Controller 104 may be configured to allow only one device to control cargo handling system 100. While FIG. 3 illustrates controller 104 being configured to allow only one device to control cargo handling system 100, it is further contemplated and understood that controller 104 and WAP 102 may be configured to allow any number of devices to control cargo handling system 100. For example, controller 104 may be configured to allow two (2) devices or five (5) devices, or twenty (20) device, etc. to control cargo handling system 100.

With combined reference to FIG. 2 and FIG. 3, controller 104 may receive a control request 200 from PED 160 (e.g., from PED controller 162). PED controller 162 may send control request 200 in response to PED controller 162 determining operator 150 has activated a cargo control program of PED 160 (determination 202).

Controller 104 may then determine a number of devices currently controlling cargo handling system 100 (determination 204). If controller 104 determines the number of devices currently controlling cargo handling system 100 is zero (Ctrl_Flag=0) (determination 206), controller 104 sends a unique control key (AP_Key) 207 to PED 160 and sets current number of devices to one (Ctrl_Flag=1).

If controller 104 determines the number of devices currently controlling cargo handling system 100 is not zero (determination 208), controller 104 sends a control request denied message (Key=0) 209 to PED 160. For example, if the PED 170 being used by operator 152 in FIG. 2 has control of cargo handling system 100, the number of devices currently controlling cargo handling system 100 is one (Ctrl_Flag=1), thus controller 104 does not allow PED 160 to control cargo handling system 100. Limiting the number of devices that may drive cargo 20, tends to increase safety and decrease opportunities for injury to persons in the cargo area and/or for damage to cargo 20.

System 190 may be configured such that when PED 160 has the unique control key (AP_Key), PED 160 controls cargo handling system 100 until operator 150 relinquishes control or a timeout is generated due to inactivity from PED 160.

PED controller 162 is configured to store the unique control key (AP_Key) received from controller 104 as in variable identification key (User_Key). In response to receiving unique control key (AP_Key), PED controller 162 may change the state of PED to connected to WAP 102 (Set Ctrl_Sel=1). Once PED controller 162 receives unique control key (AP_Key), PED controller 162 may begin sending control commands 210 including identification key (User_Key) to controller 104.

If PED controller 162 has control of cargo handling system 100, the identification key (User_Key) included with control commands 210 corresponds (i.e., matches) unique control key (AP_Key). Stated differently, controller 104 may receive control commands 210 including identification key (User_Key) from PED 160.

In various embodiments, controller 104 may activate a timer in response to sending unique control key (AP_Key) to PED 160. Controller 104 may reset the timer to zero each time a control command 210 including an identification key (User_Key) matching unique control key (AP_Key) is received from PED 160.

Controller 104 may determine if the timer has exceeded an inactivity threshold time (determination 212). If controller 104 determines the timer has exceeded the inactivity threshold time (determination 214), controller 104 generates a new unique control key (AP_Key2). Generation of the new unique control key (AP_Key2) voids, or invalidates, the unique control key (AP_Key) sent to PED 160. Generation of the new unique control key (AP_Key2) causes PED 160 to lose control of cargo handling system 100, as the identification key (User_Key) included in the control commands 210 from PED 160 does not match the new unique control key (AP_Key2). In response to determining the timer has exceeded the inactivity threshold time (determination 214), controller 104 also sets current number of devices to zero (Ctrl_Flag=0). Monitoring the inactivity of PED 160 tends to reduce occurrences of a non-active operator remaining in control of cargo handling system 100, and thus preventing a new operator from gaining control. For example, with reference to FIG. 2, if operator 150 leaves cargo deck 12 to load a different aircraft without relinquishing control of cargo handling system 100, controller 104 generating new unique control key (AP_Key2) after determination 214, allows operator 152 to gain control, thereby preventing or reducing a likelihood system 190 will be locked out by operator 150, who is no longer working in cargo deck 12.

If controller 104 determines the timer has not exceeded the inactivity threshold time (determination 216), controller 104 compares the identification key (User_Key) included with control commands 210 from PED 160 to the unique control key (AP_Key) (comparison 218). Controller 104 may also verify the current number of devices is one (Ctrl_Flag=1), thereby verifying that a device should be controlling cargo handling system 100.

If controller 104 determines that the identification key (User_Key) does not match unique control key (AP_Key) and/or that the current number of devices is not one (determination 220), controller 104 sends a bad key message (Key=Bad_Key) 222 to PED 160.

If controller 104 determines that the identification key (User_Key) matches unique control key (AP_Key) and that the current number of devices is one (determination 224), controller 104 processes control command 210. In various embodiments, before processing control command 210, controller 104 may verify PED 160 has not relinquished control of cargo handling system 100 (determination 226). For example, if PED controller 162 determines operator 150 has deactivated the cargo control program of PED 160 (determination 232), PED controller 162 may change the state of PED 160 to not-connected (set Ctrl_Sel=0) and send control command 210 as a relinquish control signal (Ctrl_Sel=0) to controller 104. PED controller 162 may also stop sending control commands 210 to controller 104 in response to determining operator 150 has deactivated the cargo control program of PED 160 (determination 232).

If controller 104 determines PED 160 is disconnected (Ctrl_Sel=0) (determination 228), controller 104 generates a new unique control key (AP_Key2), sets the current number of devices to zero (Ctrl_Flag=0), and stops the timer. Stated differently, if controller 104 receives a relinquish control from PED 160, controller 104 generates a new unique control key (AP_Key2), sets the current number of devices to zero (Ctrl_Flag=0), and stops the timer.

If controller 104 determines PED 160 is not disconnected (determination 230), controller 104 processes control command 210. In various embodiments, controller 104 processes control command 210 by sending the control command 210 to one or more PDUs 18 and/or to components configured to propel cargo 20 across cargo deck 12.

In various embodiments, controller 104 may be configured to allow multiple (i.e., two or more) PEDs to simultaneously control cargo handling system 100 (referred to herein as a multi-control device configuration). In various embodiments, in the multi-control device configuration, controller 104 is configured to allow a predetermined number of devices (i.e., a threshold number of allowed devices) to control cargo handling system 100. In the multi-control device configuration, controller 104 may assign a unique control key to each connected PED. Each connected PED and/or each unique control key may also be associated with its own dedicated timer. Upon receipt of a control request 200 from a new PED, controller 104 would determine if the number of devices currently controlling cargo handling system 100 is less than the threshold number of allowed devices. If the number of devices currently controlling cargo handling system 100 is less than the threshold number of allowed devices, controller 104 sends a new, unique control key to the new PED, adds one to the number of devices currently controlling cargo handling system 100, starts the timer associated with that PED and control key, and adds the newly assigned control key to a stored list of currently designated (i.e., valid) control keys.

In the multi-device configuration, upon receipt of a control command 210 from a PED, controller 104 would compare the identification key (User_Key) included with control command 210 to the list of currently designated control keys. If the identification key (User_Key) matches one of the controls keys on the list of currently designated control keys, controller 104 processes the control command 210. If the identification key (User_Key) does not match one of the designated control keys, controller 104 rejects the command (e.g., controller 104 sends a bad key message (Key=Bad_Key) 222 to the PED). Each time a control command 210 including a valid identification key (User_Key) is received, the timer associated with that PED and/or control key is reset to zero. If the timer associated with a PED and/or control key exceeds the inactivity threshold time, controller 104 removes the control key associated that PED and timer from the list of currently designated control keys and subtracts one from the number of devices currently controlling cargo handling system 100. If controller 104 receives a relinquish control signal from a PED, controller 104 removes the control key associated with that PED from the list of currently designated control keys and subtracts one from the number of devices currently controlling cargo handling system 100. For example, if the operator of a PED deactivates the cargo control program of the PED, controller 104 will receive a relinquish control signal including an identification key (User_Key) from the PED. In response to the relinquish control signal, controller 104 removes the control key matching the identification key (User_Key) of the relinquish control signal from the list of currently designated control keys, and subtracts one from the number of devices currently controlling cargo handling system 100.

In various embodiments, in the multi-control device configuration, controller 104 may be configured to provide the same control key to each allowed device, such that there is one valid control key at a time and the control commands 210 from each of the connected devices would include the same identification key (User_Key).

Figure 4A:
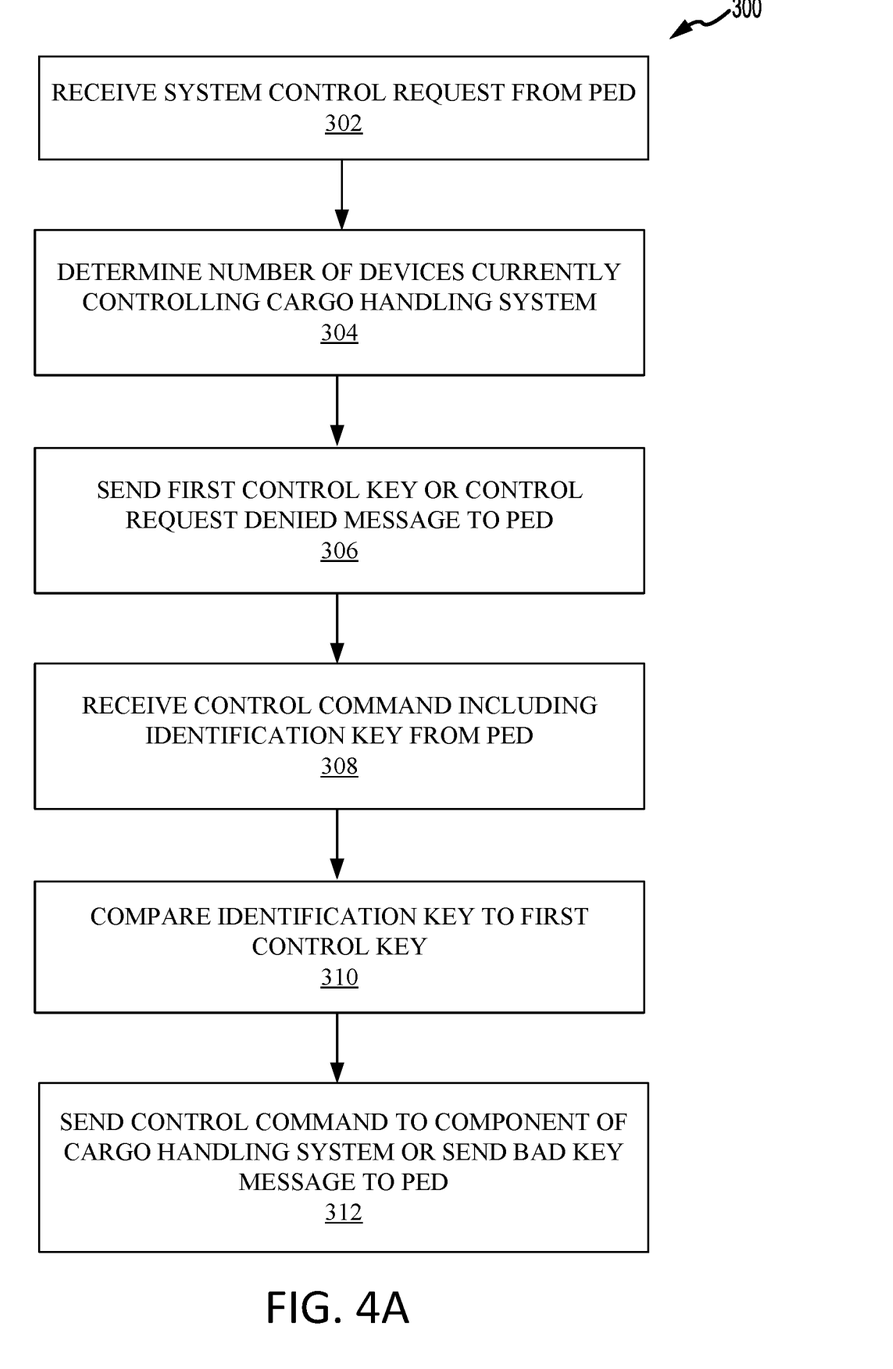
FIGS. 4A, 4B, and 4C illustrate a method of limiting control of a cargo handling system to a preselected number of devices.

With reference to FIG. 4A, a method 300 for limiting control of a cargo handling system to a preselected number of devices is illustrated. In accordance with various embodiments, method 300 includes receiving, by a controller, a system control request from a PED (step 302), determining, by the controller, a number of devices currently controlling the cargo handling system (step 304), and sending by the controller, a first control key or a control request denied message to the PED (step 306). Step 306 may comprise the controller sending the first control key to the PED if the number of devices currently controlling the cargo handling system is fewer than a threshold number of allowed devices, and the controller sending the control request denied message to the PED if the number of devices currently controlling the cargo handling system is greater than or equal to the threshold number of allowed devices.

In various embodiments, method 300 may further include receiving, by the controller, a control command including an identification key from the PED (step 308), comparing, by the controller, the identification key to the first control key (step 310), and sending, by the controller, at least one of the control command or a bad key message in response to the comparison of the identification key to the first control key (step 312). In various embodiments, step 312 may comprise the controller sending the control command to a component of the cargo handling system if the identification key matches the first control key, and the controller sending the bad key message to the portable electronic device if the identification key is different from the first control key.

Figure 4B:
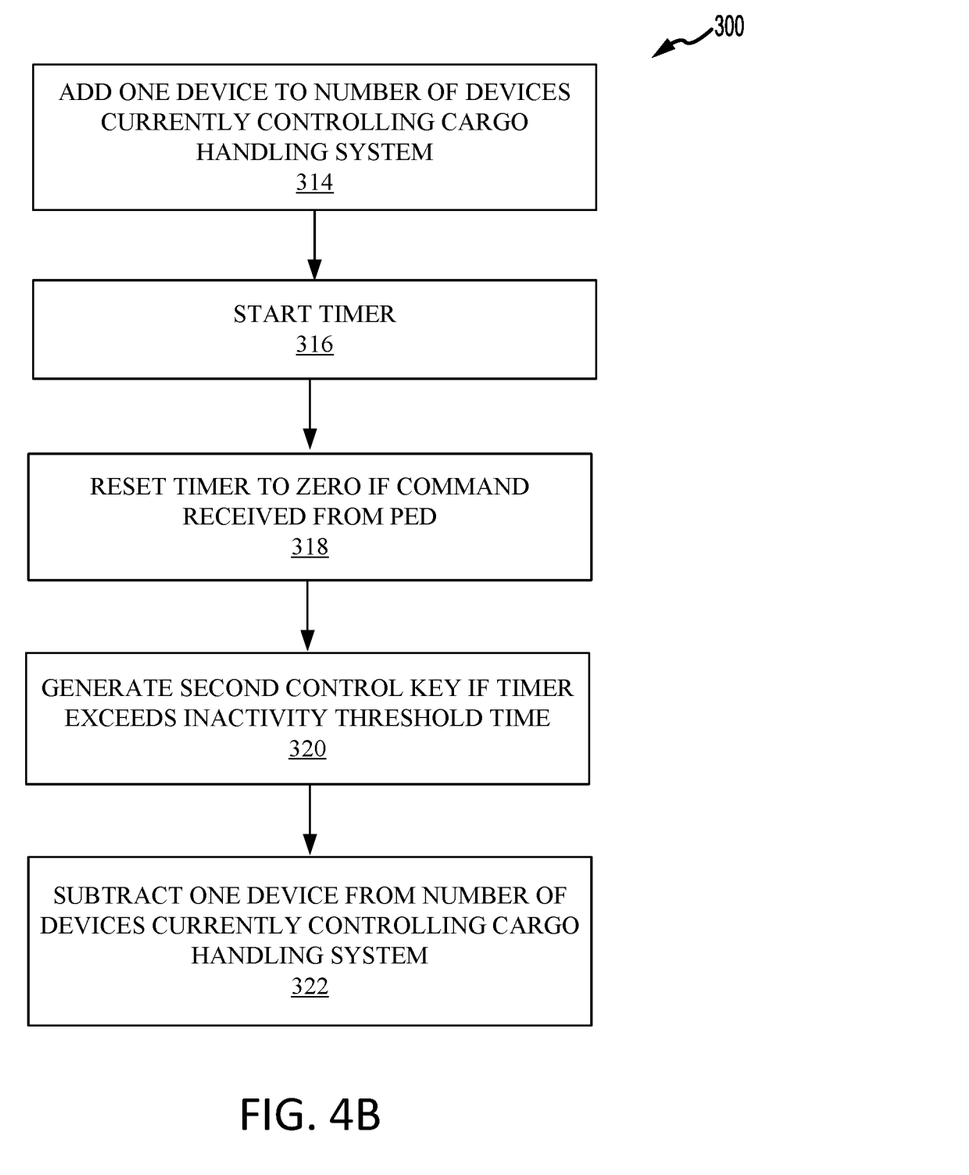

With reference to FIG. 4B, in various embodiments, method 300 may further include adding, by the controller, one device to the number of devices currently controlling the cargo handling system in response to sending the first control key to the portable electronic device (step 314), starting, by the controller, a timer in response to sending the first control key to the portable electronic device (step 316), and resetting, by the controller, the timer to zero each time a control command including an identification key matching the first control key is received from the PED (step 318).

Figure 4C:
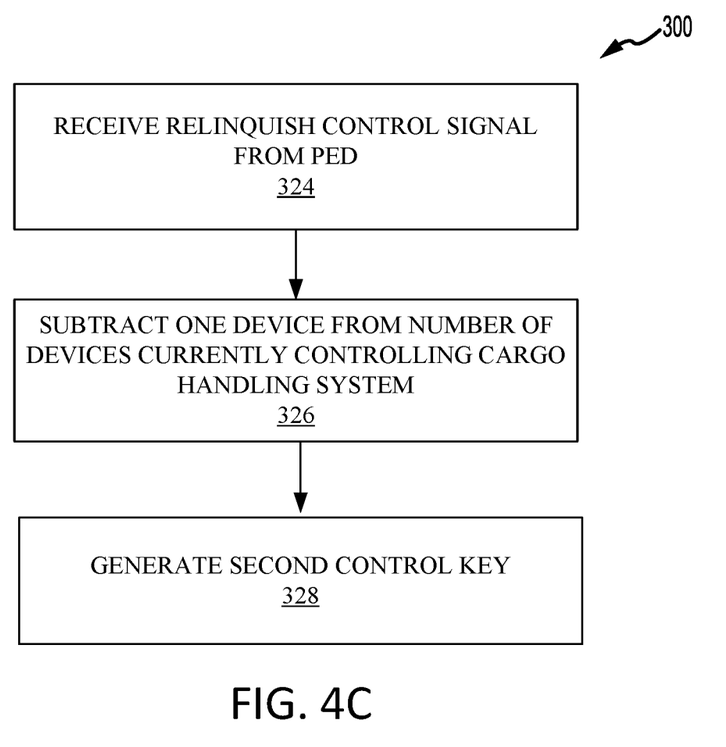

In various embodiments, method 300 may further include generating, by the controller, a second control key if the timer exceeds an inactivity threshold time (step 320), and subtracting, by the controller, one device from the number of devices currently controlling the cargo handling system in response to the timer exceeding the inactivity threshold time (step 322). In various embodiments, generation of the second control key voids, or invalidates, the first control key, With reference to FIG. 4C, in various embodiments, method 300 may further include receiving, by the controller, a relinquish control signal from the portable electronic device (step 324), and subtracting, by the controller, one device from the number of devices currently controlling the cargo handling system in response to receiving the relinquish control signal (step 326) and generating, by the controller, a second control key in response to receiving the relinquish control signal (step 328).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An article of manufacture including a tangible, non-transitory computer-readable storage medium having instructions stored thereon for limiting control of a cargo handling system to a preselected number of devices, wherein the instructions, in response to execution by a controller of a wireless access point, cause the controller to perform operations comprising:
    receiving, by the controller, a system control request from a portable electronic device;
    determining, by the controller, a number of devices currently controlling the cargo handling system;
    sending, by the controller, at least one of a first control key or a control request denied message to the portable electronic device, wherein the controller is configured to send the first control key to the portable electronic device if the number of devices currently controlling the cargo handling system is fewer than a threshold number of allowed devices, and wherein the controller is configured to send the control request denied message to the portable electronic device if the number of devices currently controlling the cargo handling system is greater than or equal to the threshold number of allowed devices;
    resetting, by the controller, a timer to zero each time a control command including an identification key matching the first control key is received from the portable electronic device; and
    generating, by the controller, a second control key if the timer exceeds an inactivity threshold time.

2. The article of claim 1, wherein the operations further comprise:
    receiving, by the controller, the control command including the identification key from the portable electronic device;
    comparing, by the controller, the identification key to the first control key; and
    sending, by the controller, at least one of the control command or a bad key message in response to the comparison of the identification key to the first control key, wherein the controller is configured to send the control command to a component of the cargo handling system if the identification key matches the first control key, and wherein the controller is configured to send the bad key message to the portable electronic device if the identification key is different from the first control key.

3. The article of claim 1, wherein the operations further comprise adding, by the controller, one device to the number of devices currently controlling the cargo handling system in response to sending the first control key to the portable electronic device.

4. The article of claim 3, wherein the operations further comprise:
    starting, by the controller, the timer in response to sending the first control key to the portable electronic device.

5. The article of claim 4, wherein the operations further comprise:
    subtracting, by the controller, one device from the number of devices currently controlling the cargo handling system in response to the timer exceeding the inactivity threshold time, and wherein generating the second control key voids the first control key.

6. The article of claim 1, wherein the operations further comprise:
    receiving, by the controller, a relinquish control signal from the portable electronic device; and
    subtracting, by the controller, one device from the number of devices currently controlling the cargo handling system in response to receiving the relinquish control signal.

7. The article of claim 6, wherein the operations further comprise generating, by the controller, a new control key in response to receiving the relinquish control signal, wherein generating the new control key voids the first control key.

8. The article of claim 7, wherein the threshold number of allowed devices is one.

9. A method for limiting control of a cargo handling system to a preselected number of devices, comprising:
    receiving, by a controller of a wireless access point, a system control request from a portable electronic device;
    determining, by the controller, a number of devices currently controlling the cargo handling system;
    sending, by the controller, at least one of a first control key or a control request denied message to the portable electronic device, wherein the controller is configured to send the first control key to the portable electronic device if the number of devices currently controlling the cargo handling system is fewer than a threshold number of allowed devices, and wherein the controller is configured to send the control request denied message to the portable electronic device if the number of devices currently controlling the cargo handling system is greater than or equal to the threshold number of allowed devices;

resetting, by the controller, a timer to zero each time a control command including an identification key matching the first control key is received from the portable electronic device; and generating, by the controller, a second control key if the timer exceeds an inactivity threshold time.

10. The method of claim 9, further comprising:

receiving, by the controller, the control command including the identification key from the portable electronic device;

comparing, by the controller, the identification key to the first control key; and sending, by the controller, at least one of the control command or a bad key message in response to the comparison of the identification key to the first control key, wherein the controller is configured to send the control command to a component of the cargo handling system if the identification key matches the first control key, and wherein the controller is configured to send the bad key message to the portable electronic device if the identification key is different from the first control key.

11. The method of claim 10, further comprising adding, by the controller, one device to the number of devices currently controlling the cargo handling system in response to sending the first control key to the portable electronic device.

12. The method of claim 9, further comprising:

starting, by the controller, the timer in response to sending the first control key to the portable electronic device.

13. The method of claim 12, further comprising:

subtracting, by the controller, one device from the number of devices currently controlling the cargo handling system in response to the timer exceeding the inactivity threshold time wherein generating the second control key voids the first control key.

14. The method of claim 9, further comprising:

receiving, by the controller, a relinquish control signal from the portable electronic device; and subtracting, by the controller, one device from the number of devices currently controlling the cargo handling system in response to receiving the relinquish control signal.

15. The method of claim 14, further comprising generating, by the controller, a new control key in response to receiving the relinquish control signal, wherein generating the new control key voids the first control key.

16. A wireless access point system for limiting control of a cargo handling system to a preselected number of devices, comprising:

a controller, wherein the controller is in operable communication with a power drive unit of the cargo handling system; and a tangible, non-transitory storage medium configured to communicate with the controller, the tangible, non-transitory storage medium having instructions stored thereon that, in response to execution by the controller, cause the controller to perform operations comprising:

receiving, by the controller, a system control request from a portable electronic device;

determining, by the controller, a number of devices currently controlling the cargo handling system;

sending, by the controller, at least one of a first control key or a control request denied message to the portable electronic device, wherein the controller is configured to send the first control key to the portable electronic device if the number of devices currently controlling the cargo handling system is fewer than a threshold number of allowed devices, and wherein the controller is configured to send the control request denied message to the portable electronic device if the number of devices currently controlling the cargo handling system is greater than or equal to the threshold number of allowed devices;

resetting, by the controller, a timer to zero each time a control command including an identification key matching the first control key is received from the portable electronic device; and generating, by the controller, a second control key if the timer exceeds an inactivity threshold time.

17. The wireless access point system of claim 16, wherein the operations further comprise:

receiving, by the controller, the control command including the identification key from the portable electronic device;

comparing, by the controller, the identification key to the first control key; and sending, by the controller, at least one of the control command or a bad key message, wherein the controller is configured to send the control command to a component of the cargo handling system if the identification key matches the first control key, and wherein the controller is configured to send the bad key message to the portable electronic device if the identification key is different from the first control key.

18. The wireless access point system of claim 16, wherein the operations further comprise:

starting, by the controller, the timer in response to sending the first control key to the portable electronic device.

19. The wireless access point system of claim 18, wherein the operations further comprise:

subtracting, by the controller, one device from the number of devices currently controlling the cargo handling system in response to at least one of:

receiving, by the controller, a relinquish control signal from the portable electronic device; or determining, by the controller, that the timer has exceeded the inactivity threshold time.

20. The wireless access point system of claim 19, wherein generating the second control key voids the first control key.

* * * * *